Oct. 12, 1965  H. M. PARMELEE  3,211,657
METHOD OF TRANSFERRING HEAT
Filed Nov. 20, 1963  2 Sheets-Sheet 2
FIG. II
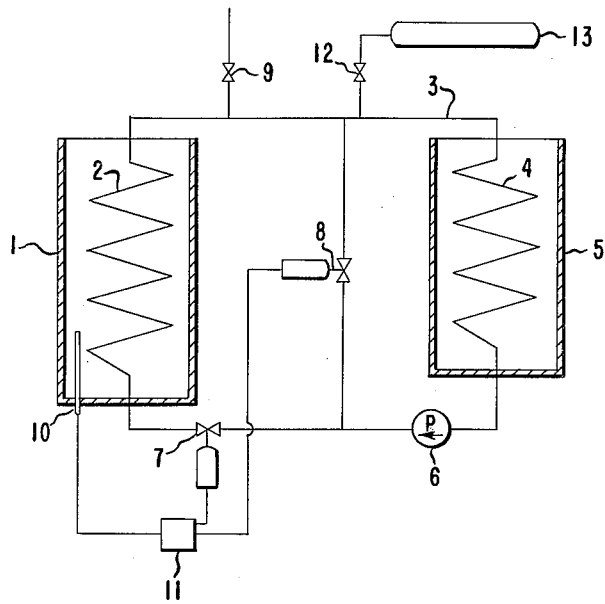
FIG. III
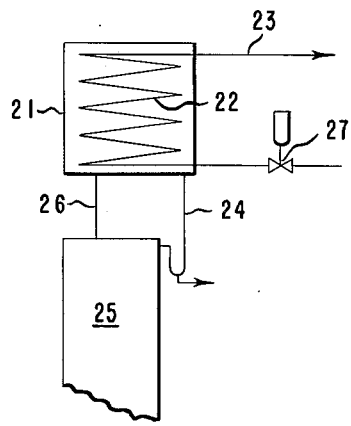
INVENTOR
HOWARD M. PARMELEE
BY *Edwin C. Woodhouse*
ATTORNEY United States Patent Office 3,211,657
Patented Oct. 12, 1965

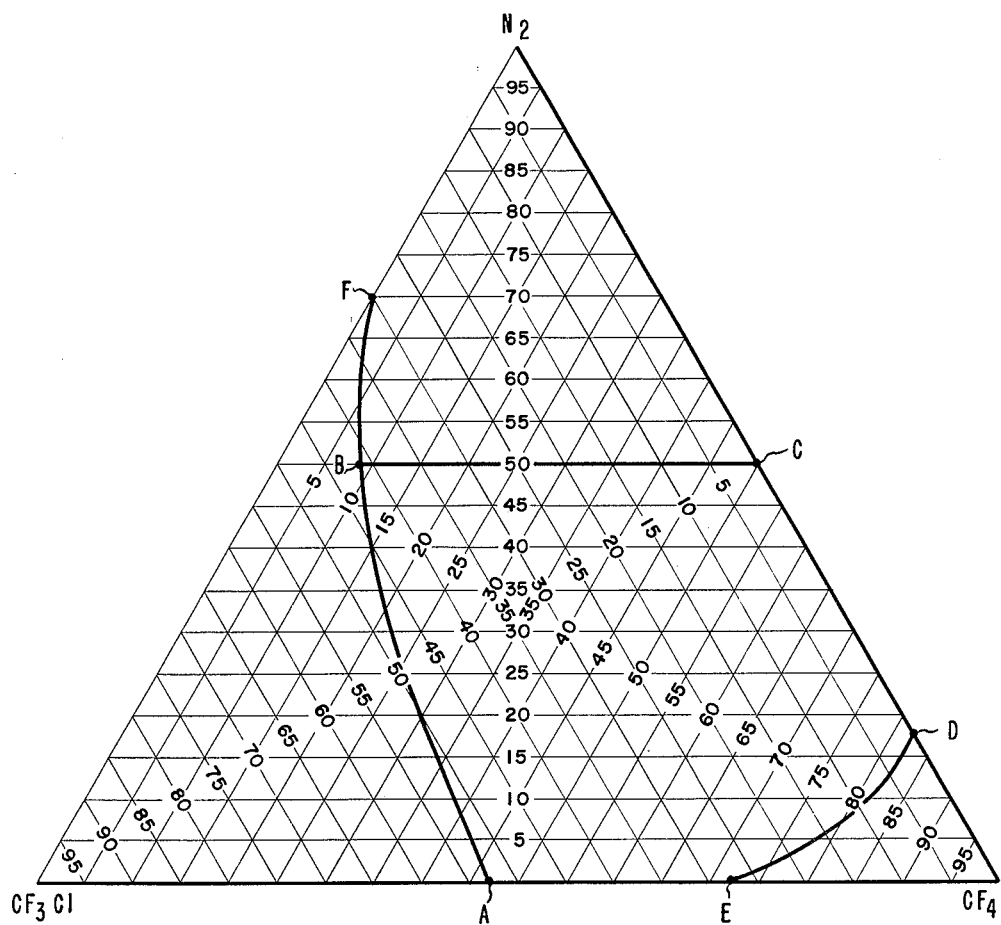
FIG. I

3,211,657
METHOD OF TRANSFERRING HEAT
Howard M. Parmelee, Woodstown, N.J., assignor to E. I. du Pont de Nemours and Company, Wilmington, Del., a corporation of Delaware
Filed Nov. 20, 1963, Ser. No. 325,042
8 Claims. (Cl. 252—78)

This invention relates to a method of transferring heat at very low temperatures, and particularly to the use of a novel heat transfer medium for that purpose.

Low temperatures of from about −196° C. to about −130° C. are required for many purposes such as the growth of single crystals, the separation of air and other gases into their constituents by low temperature distillation or condensation, and the operation of certain electronic and optical apparatus. There exists a need for heat transfer media which are liquid and have low vapor pressures at such temperatures for use in producing and maintaining those temperatures over extended periods of time and hence can be used at atmospheric pressure and do not require high pressures and high pressure equipment. Such media should also be nonflammable, nontoxic, and generally safe to use.

It is an object of this invention to provide an improved method of transferring heat at low temperatures. A particular object is to provide such a method which employs novel heat transfer media which can be used at atmospheric pressure. Other objects are to advance the art. Still other objects will appear hereinafter.

The above and other objects may be accomplished according to this invention by the method of transferring heat and maintaining a body of a material at a predetermined temperature in the range of from −195.8° C. to about −130° C. which comprises (A) Passing a liquid heat exchange medium into heat exchange relationship with a cooling means having a temperature of about −196° C. to cool said heat exchange medium to a temperature below said predetermined temperature, and (B) Then passing said cooled heat exchange medium into heat exchange relationship with said body of material, (C) Said heat exchange medium being a mixture consisting essentially of tetrafluoromethane and at least one member of the group consisting of chlorotrifluoromethane and nitrogen which mixture has a composition falling within the area defined by lines AB, BC, CD, DE and EA of FIG. I and a vapor pressure of up to about ½ atmosphere at said predetermined temperature.

FIG. I is a triangular coordinate chart of compositions consisting of mixtures of tetrafluoromethane and either or both of chlorotrifluoromethane and nitrogen. The apexes of the triangle represent 100 mole percent of tetrafluoromethane ($CF_4$), 100 mole percent of chlorotrifluoromethane ($CF_3Cl$), and 100 mole percent molecular nitrogen ($N_2$), respectively. The rest of the triangular chart represents mixtures of two or more of those substances in which the proportions are expressed in mole (or volume) percent. The heat exchange media (compositions) of this invention are those falling within the area defined by the lines AB, BC, CD, DE, and EA of said chart. The points $\underline{A}$, $\underline{B}$, $\underline{C}$, $\underline{D}$, $\underline{E}$, and $\underline{F}$ have the following coordinates:

$\underline{A}$=53 mole percent $CF_3Cl$, 47 mole percent $CF_4$ and 0 mole percent $N_2$;
$\underline{B}$=41 mole percent $CF_3Cl$, 9 mole percent $CF_4$ and 50 mole percent $N_2$;
$\underline{C}$=0 mole percent $CF_3Cl$, 50 mole percent $CF_4$ and 50 mole percent $N_2$;
$\underline{D}$=0 mole percent $CF_3Cl$, 82.5 mole percent $CF_4$ and 17.5 mole percent $N_2$;
$\underline{E}$=28 mole percent $CF_3Cl$, 72 mole percent $CF_4$ and 0 mole percent $N_2$;
$\underline{F}$=30 mole percent $CF_3Cl$, 0 mole percent $CF_4$ and 70 mole percent $N_2$.

Compositions falling between line ABF and the $CF_3Cl$ apex and between line DE and the $CF_4$ apex are at least partially solid at −195.8° C. The line BC occurs at 50 mole percent nitrogen; compositions falling between line BC and the $N_2$ apex have vapor pressures greater than one-half atmosphere absolute at −195.8° C. even though they are liquid. The vapor pressure of these mixtures at −195.8° C. is primarily determined by the concentration of nitrogen therein.

The heat transfer media of this invention are liquids at −195.8° C and atmospheric pressure, the boiling point of liquid nitrogen, and have vapor pressures of less than ½ atmosphere absolute at that temperature. They are nonflammable, nontoxic and generally otherwise safe to use, and have good heat transfer properties. Applicant is not aware of any other liquids which are available for use at −195.8° C. and which have such combination of properties. Oxygen and carbon monoxide are liquids at −195° C. but they are neither safe nor nontoxic. Hydrocarbons, such as methane, ethane and ethylene, are all solid, and even if mixtures thereof were liquid, they would be flammable and hence not safe to use.

Due to the low vapor pressures of the present heat transfer media, they are particularly adapted for use at atmospheric pressure whereby the equipment in which they are used may be fabricated from thin-walled metal or glass tubing and the like, rather than heavy-walled, high pressure apparatus. However, if desired, they can be used under elevated pressures in high pressure equipment. In any event, they should be used in closed systems so as to avoid contamination with air and moisture.

The preferred heat transfer media are free of nitrogen and hence are defined by line AE of FIG. I, consisting essentially of about 47 to about 72 mole percent of tetrafluoromethane and about 53 to about 28 mole percent of chlorotrifluoromethane. The vapor pressures of mixtures falling between lines BC and AE decrease as the concentration of nitrogen decreases from line BC to line AE, while the heat transfer properties increase. Hence the preferred compositions have the lowest vapor pressures and the best heat transfer properties.

The preferred heat transfer media, containing 47–72 mole percent tetrafluoromethane and 53–28 mole percent chlorotrifluoromethane, may be used to provide controlled cooling at any temperature of from about −130° C. to −195.8° C. at atmospheric pressure. When the heat transfer medium contains nitrogen as well as tetrafluoromethane and chlorotrifluoromethane, the maximum temperature which may be controlled at atmospheric pressure depends on the nitrogen content of the medium. Nitrogen content largely controls the vapor pressure of such mixtures. For example, a mixture corresponding to line BC in FIG. I could be used only at −195.8° C. and atmospheric pressure, because the vapor pressure would exceed one-half atmosphere at higher temperatures. Compositions having lesser concentrations of nitrogen can be used at higher temperatures, e.g. 6.7 mole percent nitrogen can be used at up to about −174° C. at atmospheric pressure and 1.9 mole percent nitrogen at up to about −152° C. at atmospheric pressure. The upper useful limit of about −130° C. at atmospheric pressure for mixtures free of nitrogen results from the vapor pressure characteristics of the mixture corresponding to point A in FIG. I. This mixture has a vapor pressure of one-half atmosphere at about −130° C. The mixture corresponding to point E has a vapor pressure of about ¾ atmosphere at −130° C. and a vapor pressure of ½ atmosphere at about −132° C. As mixtures of chlorotrifluoromethane and tetrafluoromethane vary along line AE from point E toward point A, the vapor pressure at any specific temperature becomes lower. Hence, the mixture corresponding to point A can be used at the maximum temperature of about −130° C. and atmospheric pressure. It is apparent that the nitrogen-free preferred mixtures have the widest useful range.

It will be noted that the maximum useful temperatures, given above for various mixtures of this invention, are the maximum temperatures at which the vapor pressures of those mixtures do not significantly exceed ½ atmosphere absolute and at which they can be used under atmospheric pressure with little or no tendency towards the development of vapor lock. Such mixtures can be used at somewhat higher temperatures if they are employed under superatmospheric pressures, and some of the advantages of this invention can be obtained under such conditions. However, the vapor pressures increase rapidly with increase in temperature, particularly in the case of tetrafluoromethane which has a critical temperature of −45° C., and hence said mixtures should not be used at temperatures very much higher than those indicated even at elevated pressure.

The heat transfer media of this invention can be used for the control of temperatures for a wide variety of purposes where low temperatures of from about −196° C. to about −130° C. are required. For example, they can be used in the processes of growing single crystals, e.g. of hydroxylamine, as disclosed by E. A. Meyers and W.N. Lipscomb in Acta Crystallographica, 8, 583 (1955); and by Lipscomb in Norelco Reporter, 4, 54 (1957). They may be used in the separation of air and other gases into their constituents by distillation or analogous methods described by M. Davies in "The Physical Principles of Gas Liquefaction and Low Temperature Rectification," published by Longmans, Green and Company, 1949; and by M. Ruhemann in "The Separation of Gases" published by Clarendon Press, 1949. They can be used in still other systems which require low temperature cooling described in "The Annual Review of Physical Chemistry," 4, 253 (1953); 5, 313 (1954); 8, 25 (1957) and 9, 27 (1958); in "Low Temperature Physics," National Bureau of Standards Circular No. 519 (1952); by Mendelssohn in "Progress in Cryogenics," vol. I (1959); and in "Temperature, Its Measurement and Control in Science and Industry," vols. I, II and III. Still other systems, requiring low temperature cooling and control in which the heat transfer media of this invention can be advantageously employed, will be apparent to those skilled in the art.

Representative types of apparatus or systems which may be used in the practice of this invention are further illustrated in FIGS. II and III of the drawings in which:

FIG. II is a diagrammatical representation of one form of apparatus which is suitable for use in the process of this invention; and FIG. III is a diagrammatical representation of a second form of apparatus which is suitable for use in the process of this invention.

FIG. II illustrates a typical system using the heat transfer media and process of this invention. In FIG. II, 1 is a container for the material to be cooled, e.g. a reaction vessel or a crystallization apparatus. It may contain a liquid, solid or a mixture thereof. This heat transfer system comprises a cooling coil 2 within container 1, a conduit 3 for carrying the heat transfer medium from coil 2 to a heat transfer coil 4, a container 5 which surrounds coil 4 and contains a bath of liquid nitrogen, a pump 6 for circulating the heat transfer medium, a solenoid operated control valve 7, a solenoid operated by-pass valve 8, relief valve 9, temperature sensing means 10 and controller 11 for operating valves 7 and 8, valve 12, and container 13.

In operation at atmospheric pressure, the liquid heat exchange medium is cooled in coil 4 by the liquid nitrogen bath in container 5 to approximately −195.8° C. The medium is then pumped by pump 6 through control 7, valve 8 being closed, and into coil 2. In coil 2, the medium removes heat from container 1 by heat exchange through the walls of coil 2. The warmed medium, leaving coil 2, then returns to coil 4 by way of conduit 3. The temperature sensing means 10 determines the temperature in container 1. When the temperature in container 1 reaches a desired point, controller 11 closes valve 7 and opens by-pass valve 8. It is possible to omit valves 7 and 8 and merely stop pump 6 with controller 11 when the desired temperature is reached in container 1. This mode of operation is less desirable however, since the time lag, between the demand for cooling in container 1 and the supply thereof, in restoring the circulation of the heat transfer medium, may be too long. It is also possible to retain valves 7 and 8 as hand operated valves, omitting controller 11. Then, the temperature sensing means 10 would be a thermocouple or the like. The temperature in container 1 is then maintained by interadjustment of valves 7 and 8. This mode of operation is sufficient when the heat load in container 1 is essentially constant. With a widely varying heat load in container 1, however, automatic control is more desirable, since hand operated valves would require constant attention. If it is merely desired to lower the temperature of container 1 as much as possible, valves 7 and 8 are unnecessary.

Relief valve 9 is provided for those unusual occurrences where a sudden extremely heavy heat load overpowers the cooling capacity of the system. Such loads could cause pressure increases within the system and these are released by valve 9. Valve 9 is usually set for some small positive pressure, say 5 p.s.i.g. Mixtures of chlorotrifluoromethane and tetrafluoromethane develop rather high pressures at ordinary temperatures, say 25° C. For this reason, the heat transfer medium must be removed from the system into a container capable of withstanding the pressure when cooling is removed from coil 4. Valve 12 and container 13 are provided for this purpose. Care must be taken to see that container 13 has sufficient capacity and/or strength. Container 13 may be either a high-pressure container which confines the mixture under high pressure or a relatively large volumed container into which the mixture is allowed to evaporate at a relatively low pressure. When the system is started up again, the heat transfer medium is slowly fed from container 13 while coil 4 is cooled with liquid nitrogen. The medium condenses in coil 4. If container 13 is of the high pressure variety, it may be cooled with liquid nitrogen before the addition begins. The system should be maintained free of non-condensible gases at all times to prevent vapor locks. Pressure gauges may be provided in the system if desired.

FIG. III illustrates a system similar to that of FIG. II, except that 21 is a condenser or a dephlegmator for a low temperature still which is connected to a fractionation column 25 by means of a vapor line 26 and a liquid return line 24. In this FIG. III, cooling coil 22, conduit 23 and solenoid operated control valve 27 correspond to the elements 2, 3 and 7 of FIG. II and form part of a heat exchange system corresponding to the elements 2 to 13 of FIG. II. The operation of the heat exchange system of FIG. III will be similar to that of FIG. II as hereinbefore described.

The heat exchange systems of FIGS. II and III can be similarly applied to electronic equipment, optical apparatus, and the like which must be maintained at very low temperatures during use. In such cases, the equipment to be maintained at the low temperatures will replace the elements 1 and 21, and the cooling coils 2 and 22 will be modified, e.g. so as to surround the equipment to be cooled, or replaced by other forms of heat exchange elements, e.g. cooling jackets, as may be required by the form and nature of the equipment to be cooled. Such equipment to be cooled is made of material, and should be understood to be included in the term "a body of material" as used herein.

A typical use for the system of FIG. II is in the growing of single crystals. It is well known that materials, such as hydrazine or hydroxylamine, are unstable at ordinary temperatures unless complexed with an acid or with water. In order to obtain single crystals of these materials in uncomplexed form for study, it is necessary to grow such crystals at very low temperatures such as at liquid nitrogen temperature. The system of FIG. II can be used to maintain the required very low temperatures required during the growing of such crystals in container 1.

The distillation system of FIG. III can be used to distill very low boiling materials either at atmospheric or superatmospheric pressures. For example, the system can be used for the distillation and separation of rare, inert gases, such as neon and argon, obtained from air.

It will be understood that the specific forms of apparatus shown in FIGS. II and III, the specific indicated uses thereof, and specific mixtures described hereinbefore, are given for illustrative purposes solely, and that this invention is not limited to the specific embodiments so shown and described. On the other hand, it will be apparent to those skilled in the art that, subject to the limitations set forth in the general description, many variations and modifications can be made in the form and type of apparatus, the processes, the conditions, and the proportions of the ingredients in the heat transfer media, without departing from the spirit and scope of this invention.

From the foregoing description, it will be apparent that this invention provides a novel method for transferring heat at low temperatures by the use of novel heat transfer media which are liquids having low vapor pressures whereby they can be used at atmospheric pressure in a wide vairety of processes and do not require high pressures or high pressure equipment. The heat transfer media are nonflammable, nontoxic, and generally safe to use. Accordingly, it will be apparent that this invention constitutes a valuable advance in and contribution to the art.

The embodiments of the invention in which an exclusive property or privilege is claimed are defined as follows:

1. The method of transferring heat and maintaining a body of a material at a predetermined temperature in the range of from −195.8° C. to about −130° C. which comprises
    (A) passing a liquid heat exchange medium into heat exchange relationship with a solid cold surface having a temperature of about −196° C. to cool said heat exchange medium to a temperature below said predetermined temperature, and
    (B) then passing said cooled heat exchange medium into heat exchange relationship with said body of material,
    (C) said heat exchange medium being a mixture consisting essentially of tetrafluoromethane and at least one member of the group consisting of chlorotrifluoromethane and nitrogen which mixture has a composition falling within the area defined by lines AB, BC, CD, DE and EA of FIG. I and a vapor pressure of up to about ½ atmosphere at said predetermined temperature.

2. The method of transferring heat and maintaining a body of a material at a predetermined temperature in the range of from −195.8° C. to about −130° C. which comprises
    (A) passing a liquid heat exchange medium into indirect heat exchange relationship with liquid nitrogen to cool said heat exchange medium to a temperature below said predetermined temperature, and
    (B) then passing said cooled heat exchange medium into heat exchange relationship with said body of material,
    (C) said heat exchange medium being a mixture consisting essentially of tetrafluoromethane and at least one member of the group consisting of chlorotrifluoromethane and nitrogen which mixture has a composition falling within the area defined by lines AB, BC, CD, DE and EA of FIG. I and a vapor pressure of up to about ½ atmosphere at said predetermined temperature.

3. The method of transferring heat and maintaining a body of a material at a predetermined temperature in the range of from −195.8° C. to about −130° C. which comprises
    (A) passing a liquid heat exchange medium into indirect heat exchange relationship with liquid nitrogen to cool said heat exchange medium to a temperature of about −196° C., and
    (B) then passing said cooled heat exchange medium into heat exchange relationship with said body of material,
    (C) said heat exchange medium being a mixture consisting essentially of tetrafluoromethane and at least one member of the group consisting of chlorotrifluoromethane and nitrogen which mixture has a composition falling within the area defined by lines AB, BC, CD, DE and EA of FIG. I and a vapor pressure of up to about ½ atmosphere at said predetermined temperature.

4. The method of transferring heat and maintaining a body of a material at a predetermined temperature in the range of from −195.8° C. to about −130° C. which comprises
    (A) passing a liquid heat exchange medium into heat exchange relationship with a solid cold surface having a temperature of about −196° C. to cool said heat exchange medium to a temperature below said predetermined temperature, and
    (B) then passing said cooled heat exchange medium into heat exchange relationship with said body of material,
    (C) said heat exchange medium being a mixture consisting essentially of about 47 to about 72 mole percent of tetrafluoromethane and about 53 to about 28 mole percent of chlorotrifluoromethane.

5. The method of transferring heat and maintaining a body of a material at a predetermined temperature in the range of from −195.8° C. to about −130° C. which comprises
    (A) passing a liquid heat exchange medium into indirect heat exchange relationship with liquid nitrogen to cool said heat exchange medium to a temperature of about −196° C., and
    (B) then passing said cooled heat exchange medium into heat exchange relationship with said body of material,
    (C) said heat exchange medium being a mixture consisting essentially of about 47 to about 72 mole percent of tetrafluoromethane and about 53 to about 28 mole percent of chlorotrifluoromethane.

6. The method of transferring heat and maintaining a body of a material at a predetermined temperature in the range of from −195.8° C. to about −130° C. which comprises
    (A) passing a liquid heat exchange medium into heat exchange relationship with a solid cold surface having a temperature of about −196° C. to cool said heat exchange medium to a temperature below said predetermined temperature, and
    (B) then passing said cooled heat exchange medium into heat exchange relationship with said body of material,
    (C) said heat exchange medium being a mixture consisting essentially of about 47 mole percent of tetrafluoromethane and about 53 mole percent of chlorotrifluoromethane.

7. The method of transferring heat and maintaining a body of a material at a predetermined temperature in the range of from −195.8° C. to about −130° C. which comprises
- (A) passing a liquid heat exchange medium into heat exchange relationship with a solid cold surface having a temperature of about −196° C. to cool said heat exchange medium to a temperature below said predetermined temperature, and
- (B) then passing said cooled heat exchange medium into heat exchange relationship with said body of material,
- (C) said heat exchange medium being a mixture consisting essentially of tetrafluoromethane, chlorotrifluoromethane and nitrogen which mixture has a composition falling within the area defined by lines AB, BC, CD, DE and EA of FIG. I and a vapor pressure of up to around ½ atmosphere at said predetermined temperature.

8. The method of transferring heat and maintaining a body of a material at a predetermined temperature in the range of from −195.8° C. to about −130° C. which comprises
- (A) passing a liquid heat exchange medium into heat exchange relationship with a solid cold surface having a temperature of about −196° C. to cool said heat exchange medium to a temperature below said predetermined temperature, and
- (B) then passing said cooled heat exchange medium into heat exchange relationship with said body of material,
- (C) said heat exchange medium being a mixture consisting essentially of about 50 to about 82.5 mole percent of tetrafluoromethane and about 50 to about 17.5 mole percent of nitrogen which mixture has a vapor pressure of up to about ½ atmosphere at said predetermined temperature.

References Cited by the Examiner

UNITED STATES PATENTS 2,534,789  12/50  Miller et al. _____ 252—69 XR

OTHER REFERENCES

Refrigeration Engineering, 57, pp. 336–9 (1949).

JULIUS GREENWALD, *Primary Examiner.*